United States Patent
Friedman et al.

(10) Patent No.: US 7,103,783 B1
(45) Date of Patent: Sep. 5, 2006

(54) METHOD AND SYSTEM FOR PROVIDING DATA SECURITY IN A FILE SYSTEM MONITOR WITH STACK POSITIONING

(75) Inventors: George Friedman, Austin, TX (US); Robert Phillip Starek, Austin, TX (US); Carlos A. Murdock, Austin, TX (US)

(73) Assignee: Pinion Software, Inc., TX (US)

( * ) Notice: Subject to any disclaimer, the term of this patent is extended or adjusted under 35 U.S.C. 154(b) by 1013 days.

(21) Appl. No.: 09/701,201

(22) PCT Filed: Sep. 29, 2000

(86) PCT No.: PCT/US00/26828

§ 371 (c)(1),
(2), (4) Date: Nov. 27, 2000

(87) PCT Pub. No.: WO01/26276

PCT Pub. Date: Apr. 12, 2001

(51) Int. Cl.
*H04L 9/00* (2006.01)
*G06F 11/30* (2006.01)
*G06F 13/28* (2006.01)
*G06F 3/02* (2006.01)
*G06F 15/173* (2006.01)
*G06F 15/16* (2006.01)

(52) U.S. Cl. .............. 713/200; 713/164; 713/165; 713/166; 713/201; 713/202; 710/26; 710/28; 710/43; 709/223; 709/226; 709/229

(58) Field of Classification Search ........ 713/164–166, 713/200–202; 709/220–229; 719/321, 327, 719/330; 710/26, 28, 43

See application file for complete search history.

(56) References Cited

U.S. PATENT DOCUMENTS

| | | | | | |
|---|---|---|---|---|---|
| 5,220,653 | A | * | 6/1993 | Miro | 718/107 |
| 5,613,123 | A | * | 3/1997 | Tsang et al. | 713/1 |
| 5,732,239 | A | * | 3/1998 | Tobagi et al. | 711/114 |
| 5,784,615 | A | * | 7/1998 | Lipe et al. | 719/324 |
| 5,784,647 | A | * | 7/1998 | Sugimoto | 710/39 |
| 5,978,815 | A | * | 11/1999 | Cabrera et al. | 707/204 |
| 5,978,856 | A | * | 11/1999 | Jones | 711/114 |
| 5,991,797 | A | * | 11/1999 | Futral et al. | 709/216 |
| 6,044,415 | A | * | 3/2000 | Futral et al. | 710/33 |
| 6,202,147 | B1 | * | 3/2001 | Slaughter et al. | 713/1 |

(Continued)

OTHER PUBLICATIONS

Parker, May 1989, Computer Language, v6, n5, p. 49(6), p. 1-5.*

*Primary Examiner*—Ayaz Sheikh
*Assistant Examiner*—Jenise Jackson
(74) *Attorney, Agent, or Firm*—DLA Piper Rudnick Gray Cary US LLP

(57) ABSTRACT

A System for providing data security in a first device driver operably installed in a computer operating system having a layered plurality of device drivers (81, 82, 83, 84) for accessing data in a data storage device. The first device driver detects an I/O request, and determines whether the first device driver is functionally uppermost in the layered plurality of device drivers. If the first device driver is functionally uppermost in the layered plurality of device drivers, the method performs the I/O request (80) in the first device driver. If the device driver is not functionally uppermost in the layered plurality of device drivers, the method denies the I/O request in the first device driver, and allows the I/O request to be performed by the next lowest-level driver in the layered plurality of device drivers.

26 Claims, 4 Drawing Sheets

U.S. PATENT DOCUMENTS 6,496,873 B1 * 12/2002 Brunet et al. ............... 719/321
6,532,535 B1 * 3/2003 Maffezzoni et al. ........... 713/1
6,629,143 B1 * 9/2003 Pang ......................... 709/226
6,654,864 B1 * 11/2003 Shaath et al. ............... 711/163
6,832,379 B1 * 12/2004 Zeryck et al. .............. 719/327

* cited by examiner

METHOD AND SYSTEM FOR PROVIDING DATA SECURITY IN A FILE SYSTEM MONITOR WITH STACK POSITIONING

FIELD OF THE INVENTION

The present invention pertains to the field of file systems in electronic computers. In particular, the invention relates to a method and system for providing data security in a file system monitor using stack positioning.

BACKGROUND OF THE INVENTION

Computer systems typically include one or more local or networked data storage devices. A typical application program executing on such a computer system accesses such data storage devices by calling standard file system services provided by an operating system, such as services for creating, reading, and writing files on the data storage devices.

A device driver is a set of computer-implemented instructions that implements the device-specific aspects of generic input/output operations. In typical operating systems, software applications such as device drivers run in either "kernel mode" or "user mode." A virtual device driver is a type of device driver that has direct access to an operating system kernel, such as by running in kernel mode. "Kernel mode" is a highly privileged memory access mode of the processor. "User mode" is a less privileged memory access mode of the processor. The memory access mode is a part of the hardware state of the processor. The kernel mode privilege level is also known as "Ring 0," and the user mode privilege level is also known as "Ring 3." Kernel mode access allows the virtual device driver to interact with system and hardware resources at a very low level.

In conventional operating systems, device drivers may be represented as layered on top of one another. The layered architecture is also sometimes referred to as a stack or a calling chain. It is the lowest-level device driver that typically controls a hardware device. If there is only a single device driver above the hardware device, the driver is called a monolithic driver. However, a plurality of drivers may be placed above the lowest-level driver. Input and output requests ("I/O requests") to the hardware device or devices controlled by a lowest-level driver are handled first by the highest-level driver, then seriatim by any lower-level intermediate drivers, and finally by the lowest-level driver.

A file system driver is generally a highest-level driver, layered above a device driver for a data storage device such as a hard disk drive. The file system driver implements high-level aspects of I/O requests directed to the file system, such as requests to create, open, extend, and delete files and directories. A plurality of file system drivers may exist in a single computer, and file system drivers may be specific to different types of file systems, such as the FAT and NTFS file systems.

It is known in the art to monitor file I/O requests in operating systems having an installable file system manager and layered device drivers, such as the Windows 95®, Windows 98®, and Windows Me® operating systems available from Microsoft Corporation of Redmond, Wash., and collectively referred to herein as "Windows 9x". In Windows 9x operating systems, file system monitoring may be accomplished by registering a file system applications programming interface hook with the installable file system manager. Windows 9x provides a function called IFSMGR_InstallFileSystemApiHook which is designed to be used for monitoring I/O requests to a file system. This service allows virtual device drivers to monitor all file system activity by hooking into the file system calls. By means of a call during system initialization to IFSMGR_InstallFileSystemApiHook, a virtual device driver may insert itself onto the stack of all file system requests.

A somewhat different approach has been used to monitor file systems on object-oriented operating systems, such as the Windows NT® operating system and successor operating systems such as Windows 2000®, available from Microsoft Corporation of Redmond, Wash., and collectively referred to herein as "Windows NT." In Windows NT, I/O requests are described by data structures known as I/O Request Packets ("IRPs"), which are used for communication between software applications and drivers. All IRPs to hardware devices are handled by device drivers operating in kernel mode. High-level, intermediate, and low-level drivers exchange IRPs to complete a given I/O request. The lowest-level driver calls an NT layer known as the Hardware Access Layer (HAL) to gain direct control of the hardware. It is known on a Windows NT system to implement a file system monitor as a device driver object that creates filter device objects and attaches those objects to target file system device objects, so that the file system monitor will see all IRPs directed to the monitored data storage devices.

There is a need in the field of file systems in electronic computers to prevent unauthorized activity. Unauthorized activity includes, without limitation, the release of data from a secured file or a secured file system to an insecure file system device driver, and the malicious, unauthorized, or accidental modification or corruption of data, such as by computer viruses. Conventional file system drivers, such as file system monitors that are used to detect and monitor activity in file systems, have not typically included effective security measures to prevent unauthorized activity by a software application or device driver that is layered, or attempts to layer itself, at a higher level than the highest-level device driver above the targeted data storage device.

SUMMARY OF THE INVENTION

It is a principal object of the present invention to improve the security of data stored in data storage devices on electronic computers.

Another object of the present invention is to prevent unauthorized activity in connection with secured data files or file systems.

Another object of the present invention is to maintain the position of the device driver of the present invention as the highest-level device driver above a secured data storage device.

Another object of the present invention is to prevent any software application or device driver from being layered at a higher level than the device driver of the present invention, and thereby gaining access that would permit unauthorized activity.

These and other objects are provided by a method and system for providing data security in a file system monitor by stack positioning.

More particularly, the present invention relates to a method for providing data security in a first device driver operably installed in a computer operating system having a layered plurality of device drivers for accessing data in a data storage device, comprising the steps of detecting an I/O request, and determining whether the first device driver is functionally uppermost in the layered plurality of device drivers. If the first device driver is functionally uppermost in the layered plurality of device drivers, the method of the invention performs the I/O request in the first device driver. If the first device driver is not functionally uppermost in the layered plurality of device drivers, the method of the invention denies the I/O request in the first device driver, and allows the I/O request to be performed by a next lower-level device driver in the layered plurality of device drivers.

In another aspect, the invention relates to a system for providing data security, the system comprising a first device driver operably installed in a computer operating system having a layered plurality of device drivers for accessing data in a data storage device.

In still another aspect, the invention comprises a machine-readable medium comprising secured data and a first device driver program for providing data security when operably installed in a computer operating system having a layered plurality of device drivers for accessing data in a data storage device.

In yet another aspect, the invention comprises a computer-implemented first device driver for providing data security when operably installed in a computer operating system having a layered plurality of device drivers for accessing data in a data storage device.

Further objects and advantages of this invention will become apparent from the detailed description of a preferred embodiment, which follows.

BRIEF DESCRIPTION OF THE DRAWINGS

The present invention is described in further detail with reference to the accompanying drawings. The figures of the accompanying drawings illustrate the present invention by way of example and not limitation.

DETAILED DESCRIPTION OF PREFERRED EMBODIMENTS OF THE INVENTION

The invention will be understood more fully from the detailed description given below; which, however, should not be taken to limit the invention to a specific embodiment, but is for explanation and understanding only.

The terms "computer" or "computer system," as used herein, include any device capable of receiving, transmitting, and/or using information, including, without limitation, a processor; a microprocessor; a personal computer, such as a laptop, palm PC, desktop or workstation; a network server; a mainframe; an electronic wired or wireless device, such as for example, a telephone; an interactive television or electronic box attached to a television, such as for example, a television adapted to be connected to the Internet; a cellular telephone; a personal digital assistant; an electronic pager; and a digital watch. In an illustrative example, information is transmitted in the form of e-mail. A computer, computer system, or system of the invention may operate in communication with other systems over a network, such as, for example, the Internet, an intranet, or an extranet, or may operate as a stand-alone system.

It should also be understood that the terms "device driver" or "driver," as used herein, include any computer-implemented instructions for directly or indirectly accessing or controlling hardware devices, including, without limitation, device drivers, virtual device drivers (V×Ds), instructions using NT kernel mode architecture, instructions using Win32 driver model (WDM), and other instructions, in any computer language, directed to any computer, computer architecture, network, or operating system.

Although the embodiment illustrated in the figures comprises a device driver described for illustrative purposes as a "file system monitor," the term "file system monitor" as used herein refers generally to a device driver of any kind using the stack positioning of the present invention. Device drivers within the scope of the invention may perform any sort of useful function that may be performed by a device driver, including, without limitation, general-purpose monitoring, permission monitoring, filtering, encryption, decryption, virus detection, data mirroring, I/O functions directed toward any device, and other functions, and are not limited to either monitoring or to functions related to file systems. Any device driver which accomplishes stack positioning appropriately falls within the scope of the present invention.

Figure 1:
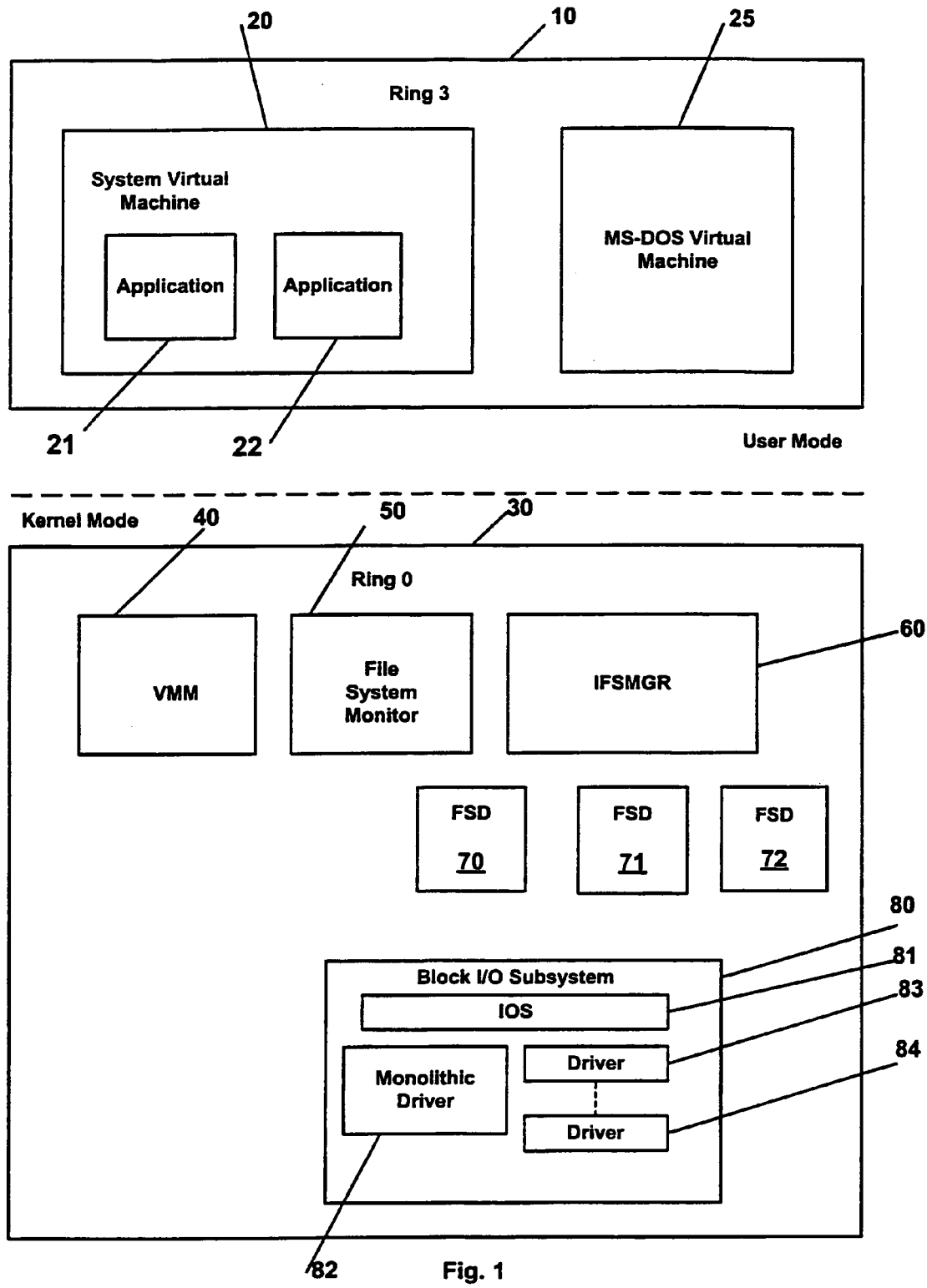
FIG. 1 is a diagram of the system architecture layout of the Windows 9x operating system.

One embodiment of the present invention may be implemented on a Windows 9x operating system. Referring now to FIG. 1, components of the Windows 9x operating system are divided between user mode code 10 and kernel mode code 30, which provide different levels of system protection. For one embodiment, the user mode code 10 includes a system virtual machine 20 capable of running 16-bit and 32-bit software applications 21–22, and a plurality of MS-DOS virtual machines 25. In this embodiment, the kernel mode code 30 comprises low-level operating system services and virtual device drivers, such as a virtual machine manager 40, a file system monitor 50 of the present invention, and an installable file system manager 60.

Beneath the installable file system manager 60 are a plurality of file system drivers 70–72 for file systems such as FAT and NTFS. Beneath the file system drivers 70–72 is a block I/O subsystem 80. The block I/O subsystem 80 includes an I/O supervisor 81 which manages requests as they pass through the file system hierarchy, a monolithic driver 82 for port I/O, and a layered plurality of device drivers 83–84.

In this embodiment, the first device driver 50 intercepts all I/O requests from user mode code 10 and from applications 21–22 running in user mode 10, before the I/O requests are sent to the installable file system manager 60. The first device driver 50 is able to monitor and, if desired, filter all file system activity occurring in the installable file system manager 60, file system drivers 70–72, and block I/O subsystem 80. By means of a call during system initialization to IFSMGR_InstallFileSystemApiHook, the first device driver 50 is hooked into such calls when the operating system is started or restarted, at which time it is inserted into a functionally uppermost position on the stack of all file system requests. From the installable file system manager 60 down through each driver in the layered plurality 83–84, an I/O request is passed from the highest level to the lowest level, and the devices can also view the result of a request as it passes back up the stack to the source of the I/O request. Each device driver on the stack may service an I/O request itself and not pass the I/O request to lower levels, or may, if desired, itself generate a new I/O request. Such device drivers may implement functions that require waiting, such as for an interrupt, or for a device to become available. During such waiting periods the device driver simply returns to its caller, allowing the calling application or device driver to perform other work in parallel with the I/O request. In the alternative, the calling application or device driver can simply wait ("block") until the I/O request is complete.

Figure 2:
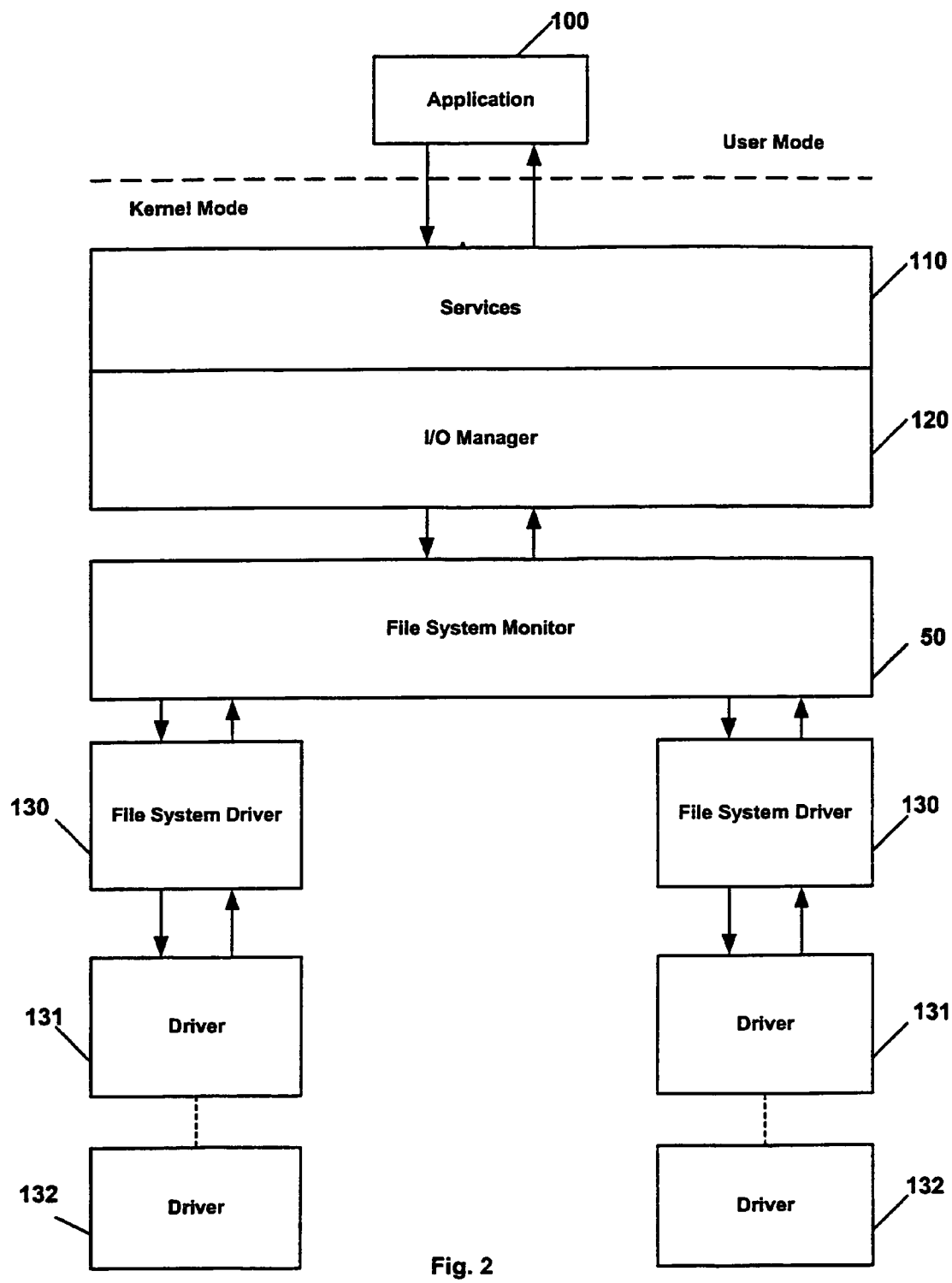
FIG. 2 is a diagram of the system architecture layout of the Windows NT operating system.

In another embodiment, illustrated with reference to FIG. 2, the present invention may be implemented on a Windows NT operating system. As is well known in the art, an application 100 running in user mode under Windows NT may send an I/O request to operating system services 110. I/O manager 120 receives I/O requests, and coordinates the transfer of I/O request packets among various drivers. In the alternative, the various drivers may communicate directly with each other without using an I/O manager 120 or other device to coordinate transfer of information among the various drivers.

The conventional input/output system of operating systems such as Windows NT comprises a plurality of device drivers 130–132 for processing I/O requests. Such device drivers are illustrated, for example, by file system drivers 130, and a layered plurality of device drivers 131–132. The I/O manager 120 typically delivers I/O request packets to the file system driver 130 responsible for managing the target of the I/O request. However, as is known in the art, a file system monitor 50 can attach to other device drivers 130–132 in an object-oriented fashion. Thereupon, the I/O manager 120 routes I/O request packets intended for the target device driver 130–132 to the file system monitor 50 that has attached to the target device driver 130–132. In this illustrative embodiment, the file system monitor 50 attaches to each of the plurality of file system driver objects 130.

Figure 3:
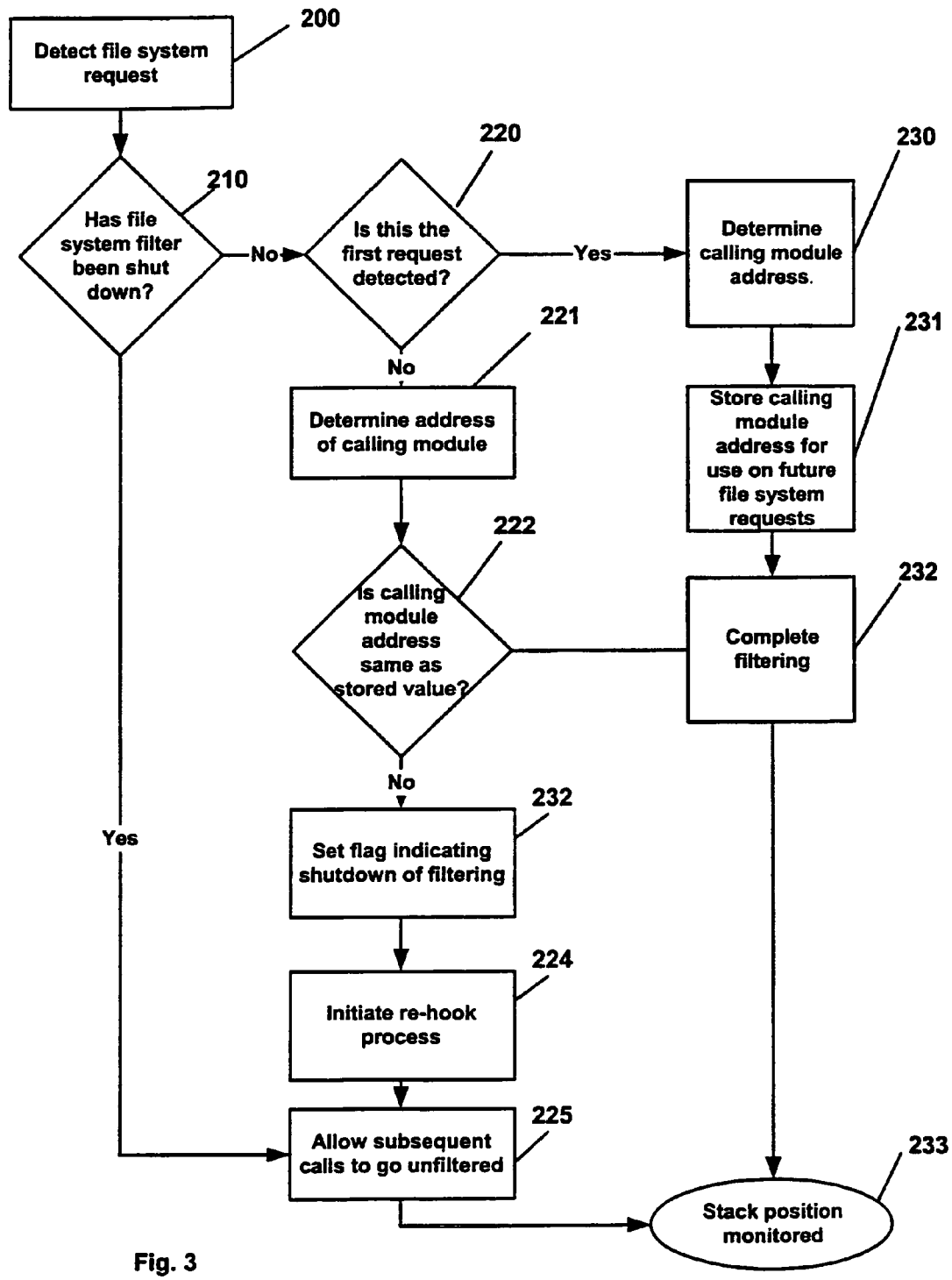
FIG. 3 is a flow chart illustrating an embodiment of the stack positioning method of the present invention.

FIG. 3 is a flow chart of one embodiment of a method for providing data security in a file system monitor 50 using stack positioning. For illustrative purposes, an embodiment is shown in which the file system monitor 50 filters file system requests, which are I/O requests directed to a file system. It should be understood, however, that the present invention may be usefully implemented in any device driver, regardless of the purpose of such device driver, without regard to file systems or monitoring functions.

As shown in FIG. 3, the stack positioning process of the present invention is initiated, in step 200, each time a file system request is detected. In step 210, the process determines whether or not the file system filter has been shut down by a previous iteration of step 223. If so, the process continues at step 225, allowing subsequent calls to go unfiltered, and exits at step 233.

Returning to step 210, if the file system filter has not been previously shut down, the process continues at step 220 and determines whether this is the first file system request detected by step 200.

If so, the process continues at step 230 and determines the calling module address. Because this is the first file system request, it is logically guaranteed that the file system monitor 50 has just been loaded, and therefore is functionally uppermost in the stack of device drivers relating to the file system. In a Windows NT embodiment, the calling module is determined by reference to an attached device field of the file system monitor 50, which will be zero when the file system monitor 50 is functionally uppermost in the stack of device drivers. Continuing to step 231, the process stores the calling module address determined at step 230. The process continues at step 232 and completes the filtering functions or other useful functions implemented in file system monitor 50. The process then concludes at step 233.

Returning to step 220, if this is not the first file system request detected by step 200, the process continues at step 221 and determines the calling module address. In a Windows NT embodiment, the calling module is determined by reference to an attached device field of the file system monitor 50, which will be non-zero if any device object has attached to the file system monitor 50. At step 222, the calling module address is compared to the address that was previously stored at step 231. By comparing the calling module addresses at this point, the file system monitor 50 will be able to detect any other driver which attempts to obtain priority over the file system monitor 50 by interposing itself between the calling module and the file system monitor 50. If the two calling module addresses are the same at step 222, the process continues at step 232.

If the two calling module addresses are not the same at step 222, the process continues at step 223, and sets a flag indicating shutdown of filtering. This flag is the same flag that is checked at step 210. The process continues at step 224 and initiates the re-hook process, which is described below with reference to FIG. 4. After step 224, the process continues at step 225, allowing subsequent calls to go unfiltered, and exits at step 233.

Figure 4:
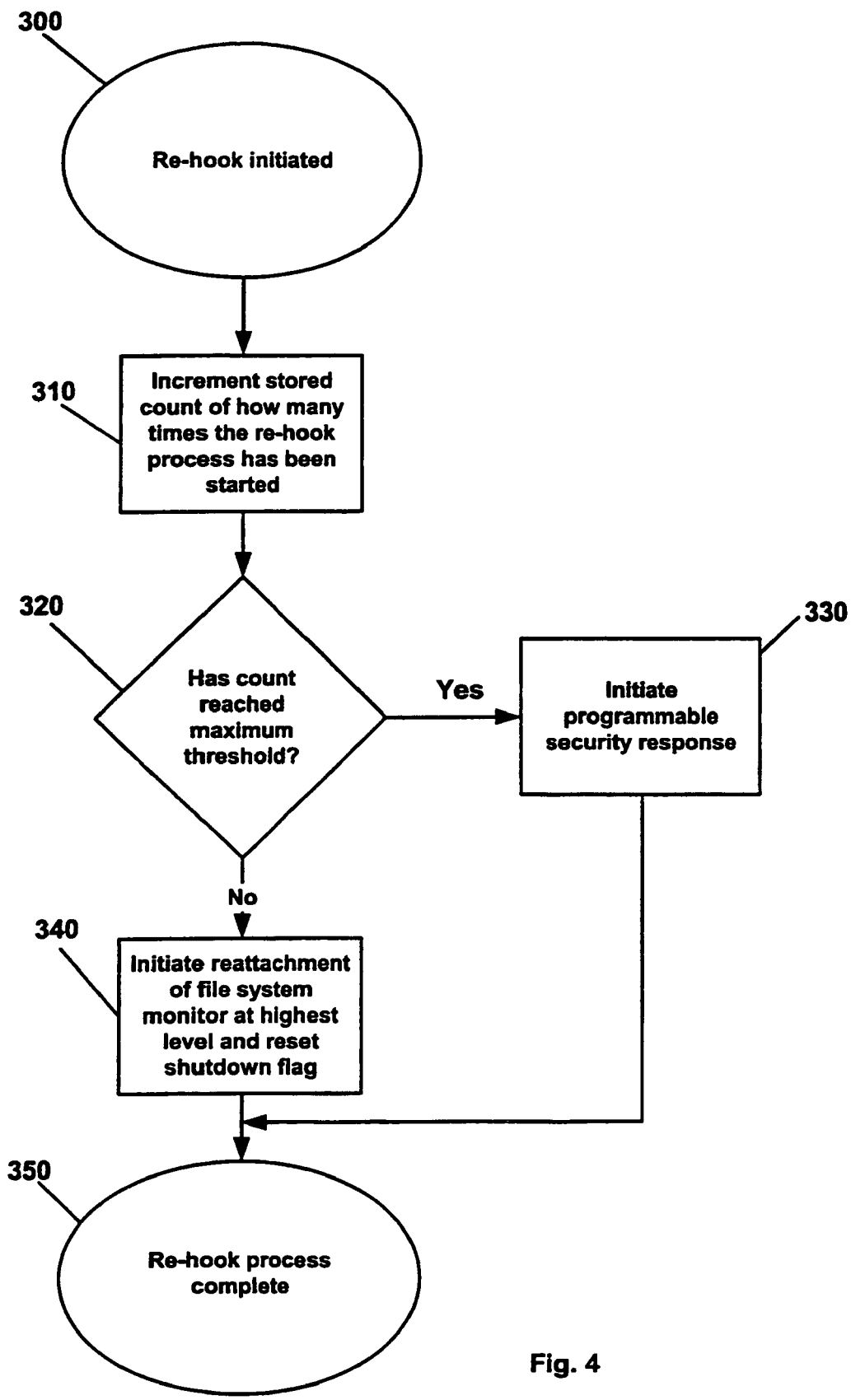
FIG. 4 is a flow chart illustrating the re-hooking steps of the stack positioning method of the present invention.

FIG. 4 is a flow chart of one embodiment of a re-hook process. At step 300, the re-hook process of the present invention is initiated. Continuing to step 310, the process increments a stored count of how many times the re-hook process has been started. Continuing to step 320, the process determines whether the stored count has reached a maximum threshold. The maximum threshold is a predetermined value which triggers a programmable security response.

In embodiments where there is zero tolerance for attempts to circumvent data security, a maximum threshold value of one will be appropriate. In embodiments where some tolerance is acceptable, a maximum threshold value higher than one will be appropriate. In alternate embodiments, multiple or alternative programmable security responses may be enabled at different thresholds.

A wide range of programmable security responses may be found desirable. Programmable security responses include, without limitation, destroying the data that was requested, or, if such data is stored in a secure virtual file system, destroying both the data and the secure virtual file system. Further embodiments of programmable security responses include terminating open applications, destroying the file system monitor on the data storage device, halting the operation of the computer, and causing the computer to enter a state requiring reboot. The preceding are illustrative examples only, and should not be construed to limit the variety of programmable security responses according to the present invention.

Returning to step 320, if the stored count has reached the maximum threshold, at step 330, the programmable security response is initiated, and the process concludes at step 350.

If the stored count has not reached the maximum threshold, at step 340 the process initiates reattachment of the file system monitor 50. This may be accomplished by initializing a new file system monitor 50 at the functionally uppermost level in the stack. In an object-oriented environment such as Windows NT, there may be many attachments to a single device object, and it is not necessary to remove or detach the file system monitor 50 from the stack, although it may be desirable to do so. Reattachment may, in an alternate embodiment, be accomplished by editing the calling chain to return the previously initialized file system monitor 50 to the functionally uppermost level.

At step 340, the process also unsets the flag indicating shutdown of filtering, to indicate that filtering may be resumed. This flag is the same flag, with reference to FIG. 3, that is set at step 223 and checked at step 210. The process then concludes at step 350.

What have been described are only some examples of methods and systems according to the invention. Various modifications to the preferred embodiments will be readily apparent to those skilled in the art, and the generic principles defined herein may be applied to other embodiments and applications without departing from the spirit and scope of the invention. Thus, the present invention is not intended to be limited to the embodiments shown. On the contrary, it is to be understood that various and numerous other arrangements may be devised by one skilled in the art without departing from the spirit and scope of the invention as limited only by the accompanying claims.

We claim:

1. A method for providing data security in a first device driver operably installed in a computer operating system having a layered plurality of device drivers for accessing data in a data storage device, the method comprising the steps of:

detecting an I/O request to said first device driver;

determining whether said first device driver has been previously called;

if said first device driver has not been previously called, detecting an initial calling module address, storing said initial calling module address, and concluding that said first device driver is functionally uppermost in the layered plurality of device drivers;

if said first device driver has been previously called, detecting a second calling module address, comparing said second calling module address to the initial calling module address, and concluding that said first device driver is functionally uppermost in the layered plurality of device drivers only if the initial calling module address matches the second calling module address;

if said first device driver is functionally uppermost in the layered plurality of device drivers, performing the I/O request in said first device driver; and if said first device driver is not functionally uppermost in the layered plurality of device drivers, denying the I/O request in said first device driver, and allowing the I/O request to be performed by a next lower-level device driver in the layered plurality of device drivers.

2. The method of claim 1 wherein said first device driver is a file system monitor.

3. The method of claim 1 wherein the data is stored in a secure virtual file system, and wherein the step of performing the I/O request further comprises the step of implementing data security measures.

4. The method of claim 1 wherein the data is stored in encrypted form, and wherein the step of performing the I/O request further comprises the step of decrypting the data.

5. The method of claim 1 wherein the step of performing the I/O request further comprises the step of checking the data for viruses.

6. A system for providing data security, the system comprising a first device driver operably installed in a computer operating system having a layered plurality of device drivers for accessing data in a data storage device, wherein said first device driver:

detects an I/O request;

determines whether said first device driver has been previously called;

if said first device driver has not been previously called, detects an initial calling module address, stores said initial calling module address, and concludes that said first device driver is functionally uppermost in the layered plurality of device drivers;

if said first device driver has been previously called, detects a second calling module address, compares said second calling module address to the initial calling module address, and concludes that said first device driver is functionally uppermost in the layered plurality of device drivers only if the initial calling module address matches the second calling module address;

if said first device driver is functionally uppermost in the layered plurality of device drivers, performs the I/O request; and if said first device driver is not functionally uppermost in the layered plurality of device drivers, denies the I/O request, and allows the I/O request to be performed by a next lower-level device driver in the layered plurality of device drivers.

7. The method of claim 6 wherein said first device driver is a file system monitor.

8. The method of claim 6 further comprising a secure virtual file system for storing the data, and wherein said first device driver performs the I/O request by implementing data security measures.

9. The method of claim 6 wherein the data is stored in encrypted form, and wherein said first device driver performs the I/O request by decrypting the data.

10. The method of claim 6 wherein said first device driver performs the I/O request by checking the data for viruses.

11. A method for providing data security in a first device driver operably installed in a computer operating system having a layered plurality of device drivers for accessing data in a data storage device, the method comprising the steps of:

detecting an I/O request to said first device driver;

determining whether said first device driver is functionally uppermost in the layered plurality of device drivers;

if said first device driver is functionally uppermost in the layered plurality of device drivers, performing the I/O request in said first device driver; and if said first device driver is not functionally uppermost in the layered plurality of device drivers, denying the I/O request in said first device driver by setting a first device driver shutdown flag and initiating a re-hook process; the re-hook process comprising:

counting the number of times the re-hook process has been initiated;

checking whether the number of times has reached a predetermined maximum threshold;

if the number of times has reached a predetermined maximum threshold, initiating programmable security response; and if the number of times has not reached a predetermined maximum threshold, initiating reattachment of said first device driver functionally uppermost in the layered plurality of device drivers, unsetting said first device driver shutdown flag and allowing the I/O request to be performed by a next lower-level device driver in the layered plurality of device drivers.

12. The method of claim 11 wherein the programmable security response comprises the step of destroying the data.

13. The method of claim 11 wherein the data is stored in a secure virtual file system, and wherein the step of destroying the data further comprises the step of destroying the secure virtual file system.

14. The method of claim 11 wherein the programmable security response comprises the step of terminating open applications.

15. The method of claim 11 wherein the programmable security response comprises the step of destroying said first device driver on the data storage device.

16. The method of claim 11 wherein the programmable security response comprises the step of halting the operation of the computer.

17. The method of claim 11 wherein the programmable security response comprises the step of causing the computer to enter a state requiring reboot.

18. A system for providing data security, the system comprising a first device driver operably installed in a computer operating system having a layered plurality of device drivers for accessing data in a data storage device, wherein said first device driver:
  detects an I/O request;
  determines whether said first device driver is functionally uppermost in the layered plurality of device drivers;
  if said first device driver is functionally uppermost in the layered plurality of device drivers, performs the I/O request; and
  if said first device driver is not functionally uppermost in the layered plurality of device drivers, denies the I/O request by setting a first device driver shutdown flag and calling a re-hook system;
  wherein the re-hook system comprises a counter that counts the number of times the re-hook system has been initiated to check whether the number of times has reached a predetermined maximum threshold,
  if the number of times has reached a predetermined maximum threshold, the re-hook system initiates a programmable security response; and
  if the number of times has not reached a predetermined maximum threshold, the re-hook system initiates reattachment of said first device driver functionally uppermost in the layered plurality of device drivers, unsets said first device driver shutdown flag and allows the I/O request to be performed by a next lower-level device driver in the layered plurality of device drivers.

19. The system of claim 18 wherein the programmable security response destroys the data.

20. The system of claim 18 further comprising a secure virtual file system for storing the data, and wherein the programmable security response destroys the data and destroys the secure virtual file system.

21. The system of claim 18 wherein the programmable security response terminates open applications.

22. The system of claim 18 wherein the programmable security response destroys said first device driver on the data storage device.

23. The system of claim 18 wherein the programmable security response halts the operation of the computer.

24. The system of claim 18 wherein the programmable security response causes the computer to enter a state requiring reboot.

25. A machine-readable medium comprising secured data and a first device driver program for providing data security when operably installed in a computer operating system having a layered plurality of device drivers for accessing data in a data storage device, said first device driver program comprising computer-implemented instructions for:
  computer-implemented instructions for detecting an I/O request to said first device driver;
  computer-implemented instructions for determining whether said first device driver has been previously called;
  if said first device driver has not been previously called, computer-implemented instructions for detecting an initial calling module address, storing said initial calling module address, and concluding that said first device driver is functionally uppermost in the layered plurality of device drivers;
  if said first device driver has been previously called, computer-implemented instructions for detecting a second calling module address, comparing said second calling module address to the initial calling module address, and concluding that said first device driver is functionally uppermost in the layered plurality of device drivers only if the initial calling module address matches the second calling module address;
  if said first device driver is functionally uppermost in the layered plurality of device drivers, computer-implemented instructions for performing the I/O request in said first device driver; and
  if said first device driver is not functionally uppermost in the layered plurality of device drivers, computer-implemented instructions for denying the I/O request in said first device driver, and allowing the I/O request to be performed by a next lower-level device driver in the layered plurality of device drivers.

26. A computer-implemented first device driver for providing data security when operably installed in a computer operating system having a layered plurality of device drivers for accessing data in a data storage device, said first device driver comprising:
  means for detecting an I/O request to said first device driver;
  means for determining whether said first device driver has been previously called;
  if said first device driver has not been previously called, means for detecting an initial calling module address, storing said initial calling module address, and concluding that said first device driver is functionally uppermost in the layered plurality of device drivers;
  if said first device driver has been previously called, means for detecting a second calling module address, comparing said second calling module address to the initial calling module address, and concluding that said first device driver is functionally uppermost in the layered plurality of device drivers only if the initial calling module address matches the second calling module address;
  if said first device driver is functionally uppermost in the layered plurality of device drivers, means for performing the I/O request in said first device driver; and
  if said first device driver is not functionally uppermost in the layered plurality of device drivers, means for denying the I/O request in said first device driver, and allowing the I/O request to be performed by a next lower-level device driver in the layered plurality of device drivers.

* * * * *

UNITED STATES PATENT AND TRADEMARK OFFICE
CERTIFICATE OF CORRECTION

| | | |
|---|---|---|
| PATENT NO. | : 7,103,783 B1 | Page 1 of 1 |
| APPLICATION NO. | : 09/701201 | |
| DATED | : September 5, 2006 | |
| INVENTOR(S) | : Friedman et al. | |

It is certified that error appears in the above-identified patent and that said Letters Patent is hereby corrected as shown below:

<u>Column 9</u>

At line 49, please change "programmable security" to -- a programmable security--.

Signed and Sealed this

Nineteenth Day of June, 2007

JON W. DUDAS
*Director of the United States Patent and Trademark Office*